United States Patent
Goto et al.

(10) Patent No.: US 8,095,643 B2
(45) Date of Patent: Jan. 10, 2012

(54) COMMUNICATION APPARATUS AND METHOD PROVIDING ROBUST SERVICE IN THE PRESENCE OF DETERIORATED RADIO CONDITIONS

(75) Inventors: Fumihide Goto, Naka-gun (JP); Tetsuo Ido, Kawasaki (JP); Kazutoshi Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 11/424,505

(22) Filed: Jun. 15, 2006

(65) Prior Publication Data

US 2006/0294227 A1 Dec. 28, 2006

(30) Foreign Application Priority Data

Jun. 22, 2005 (JP) ................. 2005-181895

(51) Int. Cl.
*G01R 31/08* (2006.01)
*G06F 15/16* (2006.01)
*G06F 15/173* (2006.01)
*H01Q 11/12* (2006.01)
*H04B 7/00* (2006.01)
*H04B 7/185* (2006.01)

(52) U.S. Cl. ..... 709/224; 370/216; 370/318; 455/127.2; 455/522; 709/228

(58) Field of Classification Search ............. 709/224, 709/228; 370/216, 318; 455/127.2, 522
See application file for complete search history.

(56) References Cited

U.S. PATENT DOCUMENTS

| 4,811,421 A * | 3/1989 | Havel et al. ............ 455/69 |
|---|---|---|
| 5,003,619 A * | 3/1991 | Morris et al. ........... 455/69 |
| 5,220,678 A * | 6/1993 | Feei .................... 455/69 |
| 5,278,992 A * | 1/1994 | Su et al. ............... 455/69 |
| 5,430,760 A * | 7/1995 | Dent ..................... 375/144 |
| 5,778,309 A * | 7/1998 | Tuttle et al. ........... 455/127.2 |
| 5,872,522 A | 2/1999 | Gibson ................. 340/10.2 |
| 5,960,361 A * | 9/1999 | Chen .................... 455/522 |
| 6,058,107 A * | 5/2000 | Love et al. ............. 370/332 |
| 6,101,375 A * | 8/2000 | Tuttle et al. ........... 455/127.2 |
| 6,104,512 A * | 8/2000 | Batey et al. ............ 398/120 |
| 6,256,477 B1 * | 7/2001 | Eidson et al. .......... 455/63.3 |

(Continued)

FOREIGN PATENT DOCUMENTS

JP 03-231523 10/1991

(Continued)

OTHER PUBLICATIONS

Martin Kubisch et al., "Distributed Algorithms for Transmission Power Control in Wireless Sensor Networks", *IEEE Wireless Communications and Networking*, vol. I, Dec. 31, 2003, pp. 558-563.

(Continued)

*Primary Examiner* — Phuoc Nguyen
*Assistant Examiner* — Daniel Murray
(74) *Attorney, Agent, or Firm* — Fitzpatrick, Cella, Harper & Scinto

(57) ABSTRACT

Data communication using wireless service discovery is continuously provided even if a radio wave condition temporarily deteriorates or movement of an apparatus occurs. If a temporary deterioration in wireless radio wave environment is found in a communication apparatus including a service discovery function, a search is made again at a raised transmission power. Forcible disconnection processing from a higher-level layer is prevented when communication at the network layer level is ongoing.

3 Claims, 6 Drawing Sheets

U.S. PATENT DOCUMENTS

| | | | |
|---|---|---|---|
| 6,298,241 B1* | 10/2001 | Hong | 455/522 |
| 6,351,651 B1* | 2/2002 | Hamabe et al. | 455/522 |
| 6,463,473 B1* | 10/2002 | Gubbi | 709/225 |
| 6,571,277 B1* | 5/2003 | Daniels-Barnes et al. | 709/213 |
| 6,650,629 B1 | 11/2003 | Takahashi et al. | 370/335 |
| 6,665,705 B1* | 12/2003 | Daniels-Barnes et al. | 709/203 |
| 6,678,750 B2* | 1/2004 | Meade et al. | 710/7 |
| 6,754,451 B1* | 6/2004 | Nakamura | 398/135 |
| 6,842,460 B1* | 1/2005 | Olkkonen et al. | 370/465 |
| 6,871,078 B2* | 3/2005 | Nishioka et al. | 455/522 |
| 6,983,164 B2* | 1/2006 | Kajimura | 455/522 |
| 6,990,354 B2* | 1/2006 | Kantola et al. | 455/522 |
| 6,993,348 B2* | 1/2006 | Ikegami et al. | 455/456.3 |
| 7,007,087 B1* | 2/2006 | Souma et al. | 709/225 |
| 7,016,684 B2* | 3/2006 | Cave et al. | 455/450 |
| 7,143,330 B2* | 11/2006 | Ahn et al. | 714/748 |
| 7,266,822 B1* | 9/2007 | Boudnik et al. | 718/100 |
| 7,275,157 B2* | 9/2007 | Cam Winget | 713/168 |
| 7,310,380 B1* | 12/2007 | Young et al. | 375/295 |
| 7,333,772 B2* | 2/2008 | Tsutsui | 455/41.2 |
| 7,346,364 B1* | 3/2008 | Tsien et al. | 455/522 |
| 7,379,958 B2* | 5/2008 | Karhu | 709/201 |
| 7,403,744 B2* | 7/2008 | Bridgelall | 455/41.2 |
| 7,406,093 B2* | 7/2008 | Furuyama et al. | 455/522 |
| 7,437,126 B2* | 10/2008 | Ikegami et al. | 455/41.2 |
| 7,487,230 B2* | 2/2009 | Gu et al. | 709/220 |
| 7,509,554 B2* | 3/2009 | Lohr et al. | 714/748 |
| 7,516,135 B2* | 4/2009 | Bayyapu | 707/10 |
| 7,532,196 B2* | 5/2009 | Hinckley | 345/156 |
| 7,558,846 B2* | 7/2009 | Gu et al. | 709/220 |
| 7,568,033 B2* | 7/2009 | Aoyagi | 709/226 |
| 7,587,494 B2* | 9/2009 | Aoyagi | 709/226 |
| 7,613,768 B2* | 11/2009 | Harville et al. | 709/203 |
| 7,706,321 B2* | 4/2010 | Saifuddin | 370/328 |
| 2001/0011023 A1* | 8/2001 | Nishioka et al. | 455/522 |
| 2002/0078214 A1* | 6/2002 | Shindou et al. | 709/229 |
| 2002/0090966 A1* | 7/2002 | Hansen et al. | 455/522 |
| 2002/0168993 A1* | 11/2002 | Choi et al. | 455/522 |
| 2002/0184304 A1* | 12/2002 | Meade et al. | 709/203 |
| 2003/0202494 A1* | 10/2003 | Drews et al. | 370/338 |
| 2004/0080771 A1* | 4/2004 | Mihira et al. | 358/1.13 |
| 2004/0170134 A1* | 9/2004 | Furuyama et al. | 370/310 |
| 2004/0199616 A1* | 10/2004 | Karhu | 709/221 |
| 2004/0236826 A1* | 11/2004 | Harville et al. | 709/203 |
| 2004/0240412 A1* | 12/2004 | Winget | 370/331 |
| 2004/0243683 A1* | 12/2004 | Yamauchi | 709/208 |
| 2004/0255030 A1* | 12/2004 | Sillanpaa | 709/228 |
| 2005/0005019 A1* | 1/2005 | Harville et al. | 709/231 |
| 2005/0015488 A1* | 1/2005 | Bayyapu | 709/225 |
| 2005/0063325 A1 | 3/2005 | Kim et al. | 370/310 |
| 2005/0071452 A1* | 3/2005 | Rosenstock et al. | 709/223 |
| 2005/0071473 A1* | 3/2005 | Rosenstock et al. | 709/226 |
| 2005/0079819 A1* | 4/2005 | Tsutsui | 455/41.2 |
| 2005/0124335 A1* | 6/2005 | Cave et al. | 455/422.1 |
| 2005/0282497 A1* | 12/2005 | Ikegami et al. | 455/41.2 |
| 2005/0288031 A1* | 12/2005 | Davis et al. | 455/452.1 |
| 2006/0040698 A1* | 2/2006 | Shiu et al. | 455/522 |
| 2006/0058053 A1* | 3/2006 | Jatschka | 455/522 |
| 2006/0089964 A1* | 4/2006 | Pandey et al. | 709/203 |
| 2006/0120338 A1* | 6/2006 | Hwang et al. | 370/338 |
| 2006/0121929 A1* | 6/2006 | Cave et al. | 455/522 |
| 2007/0081508 A1* | 4/2007 | Madhavan et al. | 370/338 |
| 2007/0087758 A1* | 4/2007 | Norris et al. | 455/456.1 |
| 2007/0124412 A1* | 5/2007 | Narayanaswami et al. | 709/217 |
| 2007/0149139 A1* | 6/2007 | Gauvreau | 455/69 |
| 2008/0056177 A1* | 3/2008 | Mori et al. | 370/318 |
| 2008/0151843 A1* | 6/2008 | Valmikam et al. | 370/338 |
| 2009/0180448 A1* | 7/2009 | Kobayashi | 370/338 |
| 2009/0210530 A1* | 8/2009 | Modi | 709/226 |
| 2009/0252134 A1* | 10/2009 | Schlicht et al. | 370/338 |
| 2009/0268671 A1* | 10/2009 | Cave et al. | 370/328 |
| 2009/0316895 A1* | 12/2009 | Platt et al. | 380/210 |
| 2010/0030905 A1* | 2/2010 | Fikouras et al. | 709/228 |

FOREIGN PATENT DOCUMENTS

| | | |
|---|---|---|
| JP | 2000-201374 | 7/2000 |
| JP | 2001-332987 | 11/2001 |
| JP | 2003-070072 | 3/2003 |
| JP | 2005-102164 | 4/2005 |

OTHER PUBLICATIONS

Ting Liu et al., "Analysis of Service Discovery Protocol (SDP) in Bluetooth System", *Computer Engineering*, vol. 28, issue 6, Jun. 2002, pp. 7-8, 110; with English translation.

IEEE Std 802.15.1-2002, Part 15.1: Wireless Medium Access Control (MAC) and Physical Layer (PHY)Specifications for Wireless Personal Area Networks (WPANs), Jun. 14, 2002, pp. 50-52.

* cited by examiner

COMMUNICATION APPARATUS AND METHOD PROVIDING ROBUST SERVICE IN THE PRESENCE OF DETERIORATED RADIO CONDITIONS

FIELD OF THE INVENTION

The present invention relates to a communication apparatus and method, for example, which search for service information and give notice of the existence of an apparatus.

BACKGROUND OF INVENTION

Discovery protocols are known as a technique for automatically acquiring service information of a network device connected on the same LAN. Discovery protocols are found in various forms. Examples of discovery protocols include UPnP (Universal Plug and Play), proposed by Microsoft, and Bonjour, proposed by Apple. There are various other ones, such as WS-Discovery and SLP (Service Location Protocol).

"Service information" refers to, for example, information (e.g., a service name) for identifying a service such as printing or file storing provided by a network device, and information required for connection, such as the network device name. A network device can easily implement connection with another network device by acquiring the service information of the other device.

In a discovery protocol, each device periodically broadcasts its service information over a network or inquires for the service information of a device at the other end, thereby managing a list of services on a LAN. In the case where an inquiry signal is sent to a device with service(s) that has once been found through a search and no response to the inquiry signal is detected, at the time of a service inquiry (search), it is determined that the device has left (disappeared from) the network and that provision of the service(s) in question by that device has stopped, and the connection with the service-providing-device at the other end is then disconnected.

Disconnecting a connection with a service-providing device is performed in a recognizable manner when the service-providing device has disappeared. The above-described service discovery is intended for a wired network. Accordingly, if there is no response to a service inquiry, it can be determined that the device at the other end has disappeared.

This causes a problem specific to wireless communication environments. Examples of such a problem include a temporary deterioration in radio wave conditions and various problems associated with movement of a device. If this kind of problem occurs, throughput decreases due to a temporary deterioration in radio wave condition at a wireless layer. However, connection with a device at the other end is still maintained, and a service-providing device is correctly performing processing.

In spite of this, if a service inquiry is sent, no response is obtained, at least temporarily, from the service-providing device. For this reason, a higher-level application which performs service discovery mistakenly determines that provision of a service has stopped and disconnects the lower-level (wireless layer) communication.

SUMMARY OF THE INVENTION

The present invention makes it possible to continue communication with a device at the other end longer, even if a factor such as a change in the communication environment occurs. In other words, the present invention reduces the likelihood of accidentally disconnecting a connection with the device at the other end due to a factor such as a change in communication environment.

The present invention is preferably implemented in a communication apparatus having a function of confirming existence of another device on a network. The communication apparatus has confirmation means for confirming existence of another device and transmission means for changing transmission power and transmitting a confirmation signal for confirming the existence of the other device, depending on a confirmation result obtained from the confirmation means.

The present invention is also preferably implemented in a communication apparatus which gives notice of existence to another device on a network. The communication apparatus has management means for managing existence of another device on the basis of a notice signal transmitted from the other device and transmission means for changing transmission power and transmitting a notice signal, depending on when the notice signal is received.

Additionally, there is provided a communication method having a confirmation step of confirming existence of another device and a transmission step of changing transmission power and transmitting a confirmation signal for confirming the existence of the other device, depending on a confirmation result obtained in the confirmation step.

Moreover, there is provided a communication method having a management step of managing existence of another device on the basis of an existence notice signal transmitted from the other device and a transmission step of changing transmission power and transmitting an existence notice signal, depending on when the notice signal is received.

The present invention makes it possible to perform communication management suitable for an environment in which a communication environment changes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

The preferred embodiments of the present invention will now be described in detail in accordance with the accompanying drawings.

As an embodiment of the present invention, wireless communication terminals and wireless communication systems comprising service discovery applications will be explained in detail below with reference to the drawings. Although examples which each use a wireless LAN system compliant with a member of the IEEE802.11 family will be mainly explained below, the communication form to be used is not necessarily limited to a wireless LAN.

First Embodiment

Figure 1:
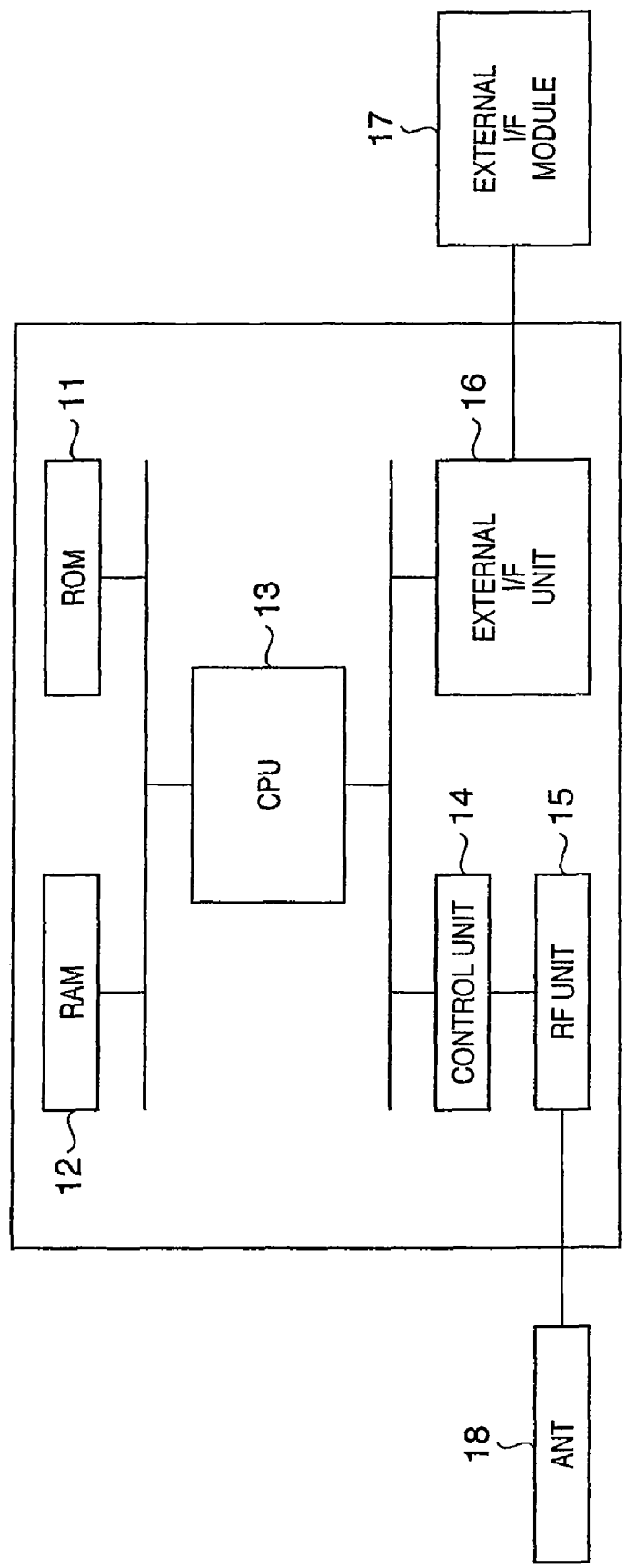
FIG. 1 is a configuration diagram of communication terminals according to embodiments of the present invention.

FIG. 1 is a block diagram showing a configuration example of a communication terminal comprising a service discovery application according to this embodiment. A communication terminal will also be referred to as, e.g., a communication apparatus or a wireless communication device.

The communication terminal has a ROM 11, a RAM 12, a CPU 13 which executes a program stored in the ROM 11, and a control unit 14 which controls a wireless function. The ROM 11 stores, e.g., a computer program for various types of control (to be described later). The RAM 12 stores, e.g., temporary variables and data. The communication terminal also incorporates an RF unit 15 compliant with a wireless LAN standard and an external interface unit 16 for connecting the communication terminal with an external apparatus. The communication terminal further has an external interface module 17 and an antenna unit 18. Although a configuration in which the communication terminal connects with an external apparatus through the external interface module 17 will be explained here, the communication terminal may be incorporated in a device of some type as its communication unit.

Figure 2:
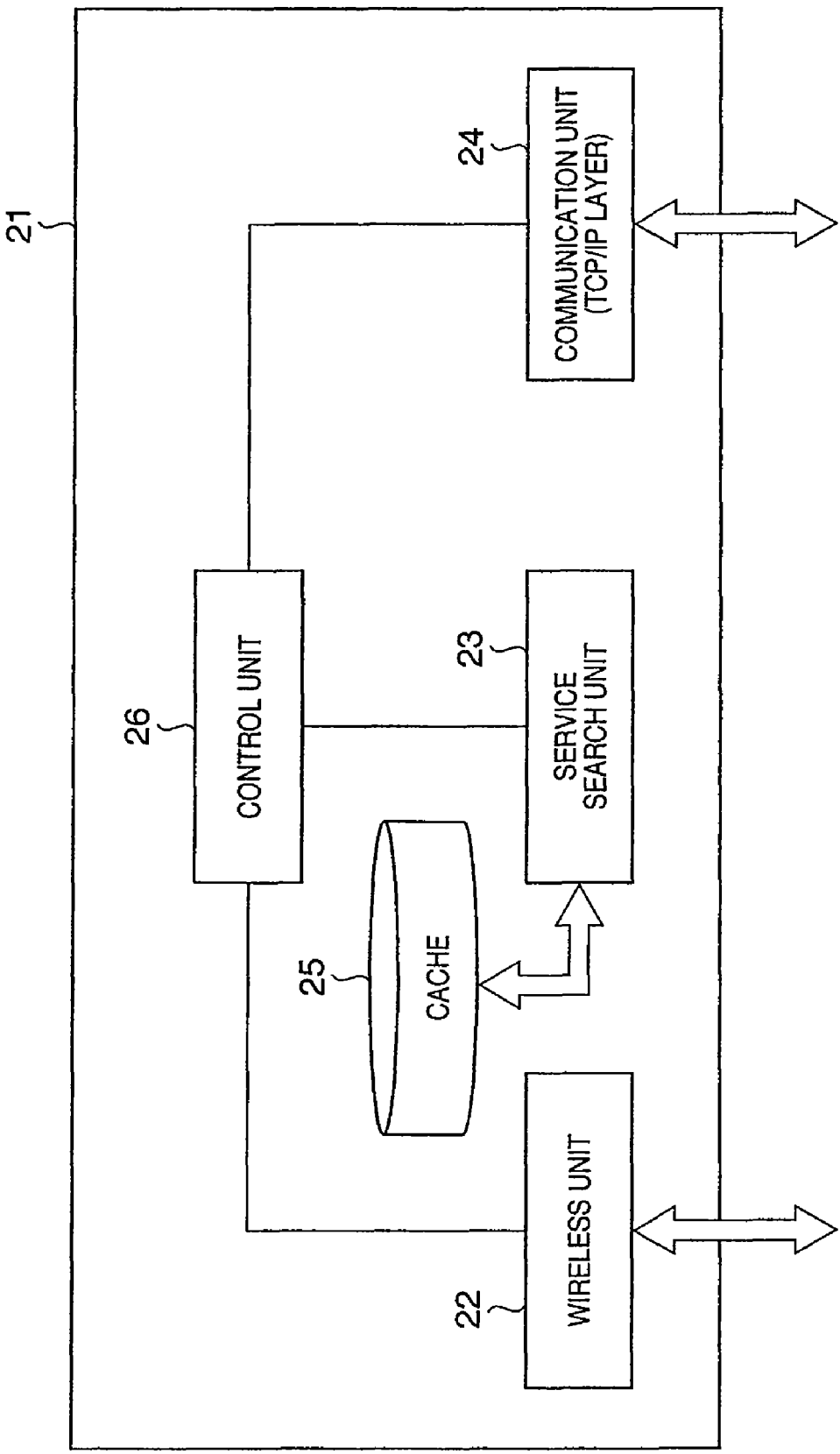
FIG. 2 is a configuration diagram of software executed by CPUs according to first and second embodiments of the present invention.

FIG. 2 shows software components to be operated by the CPU 13 which are within software stored in the ROM 11. A software component will also be referred to as a module, component, or element. The software presides over data communication using service discovery according to this embodiment.

The software 21 has a communication unit 24 which presides over data transmission and reception, a wireless unit 22 which performs wireless communication, and a service search unit 23 which performs service discovery. The software 21 also has a cache storage unit 25 for temporarily accumulating the service information of other devices acquired by performing service discovery and a control unit 26 which controls units under the control of the control unit 14. The cache storage unit 25 stores, in the RAM 12, information to be actually cached. The communication unit 24 presides over communication control of the TCP/IP layer in wireless communication by the wireless unit 22.

Figure 3:
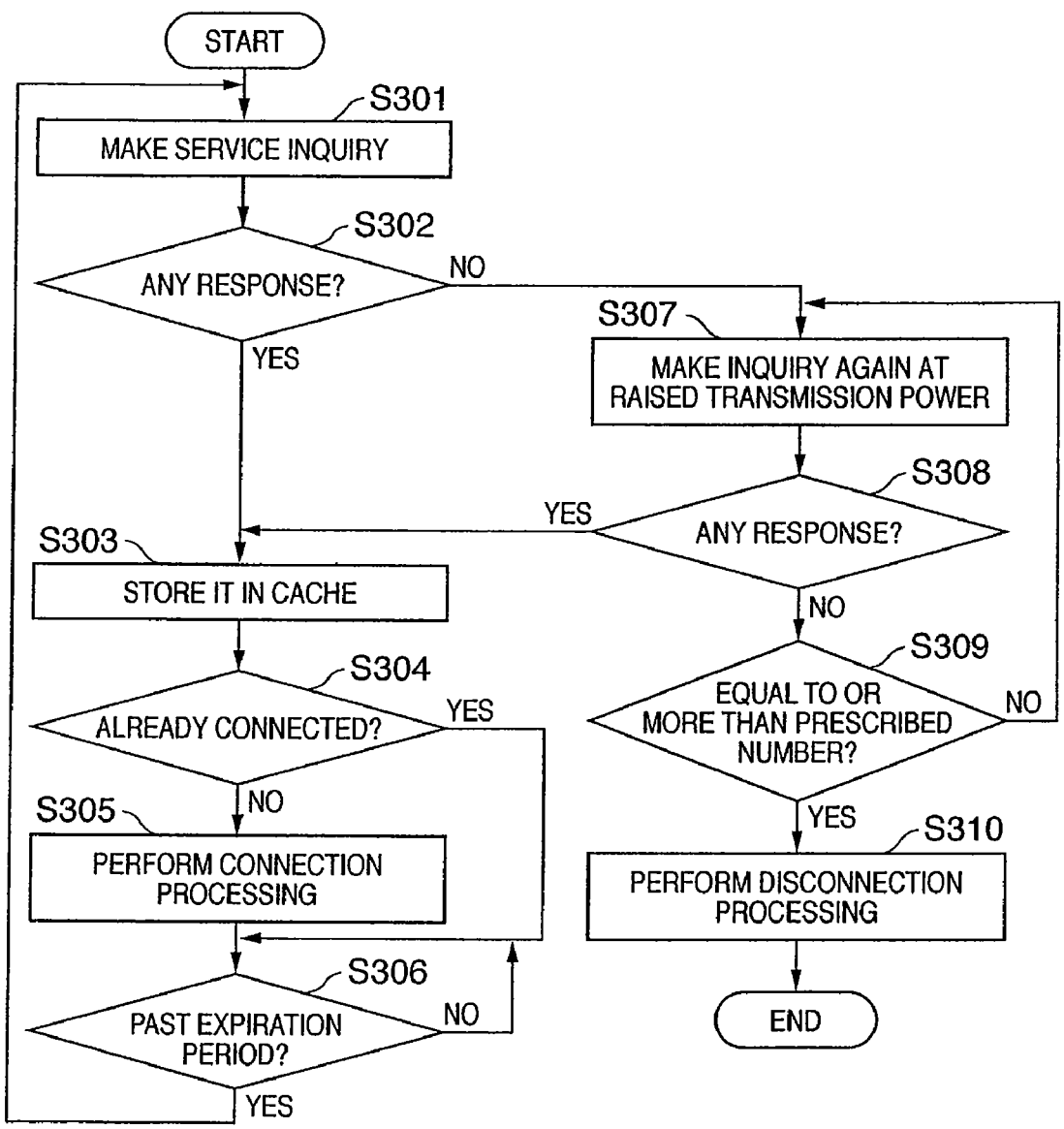
FIG. 3 is an operation flowchart of a communication terminal for explaining the first embodiment.

FIG. 3 is a flowchart for explaining the start and end of data communication using the service discovery according to this embodiment. Note that the operation of FIG. 3 is performed by the control unit 14's executing the program shown in FIG. 2.

When the communication terminal shown in FIG. 1 is to use a certain service, the service search unit 23 wirelessly transmits a service inquiry signal using the wireless unit 22 and communication unit 24 and makes a service inquiry, under the control of the control unit 26 (S301). This makes it possible to collect the information on services provided by other devices existing on a network and create a list of services or to confirm whether a service, information on which is already collected, is continuously provided from a specific device.

The service search unit 23 confirms whether there is a response to the service inquiry signal from a service providing side (step S302).

If there are one or more responses from respective terminals on the service providing side, the service search unit 23 specifies a device which provides a service desired to be used from service information contained in the response signals. The service search unit 23 stores the information on the service provided by the specified device in the cache storage unit 25 (step S303). The response signal contains, e.g., information indicating the expiration period of the cached information on the service to be provided and identification information for specifying the device having transmitted the response signal, in addition to the service information itself. Alternatively, the service information of all of the devices having transmitted the response signals may be stored. Note that memory can be efficiently utilized by not storing unnecessary service information.

After the service search unit 23 stores the service information in the cache storage unit 25, it determines whether the communication terminal is already connected with the device (S304). If the communication terminal is already connected, the flow advances to step S306; otherwise, the flow advances to step S305.

In step S305, the process of connecting the communication terminal with the service-providing-device is performed using the various types of information contained in the response signal. After that, the expiration period of the cached service information is checked (step S306). If the expiration period has passed, a service inquiry is made again (step S301).

The service inquiry at this time may be unicast to the device that the expiration period has passed or broadcast to all devices on the network. Alternatively, the service inquiry, of course, may be multicast. Unicasting of the service inquiry saves reception of unnecessary response signals and reduces processing. Broadcasting of the service inquiry makes it possible to confirm whether there is any service provided by a new device. A service inquiry is made again if the expiration period has passed in step S306. However, the service inquiry may be made before (preferably immediately before) the expiration period has passed.

On the other hand, if there is no response to the service inquiry signal in step S302, the service search unit 23 gives notice to the control unit 26 that no response is obtained. The control unit 26 instructs the wireless unit 22 to raise the transmission power (wireless transmission power) and instructs the service search unit 23 to make a service inquiry again. Consequently, the wireless transmission power is raised, and a service inquiry is made again, as a remedial process (step S307).

After that, the service search unit 23 confirms whether there are any responses to the service inquiry made in step S307 (S308). If the communication terminal is already connected with any device, the service search unit 23 confirms whether there is any response from that device. If the result of the confirmation in step S308 shows that there is a response, the flow advances to step S303 described above. Communication with the device is hereafter performed at the transmission power set in step S307.

On the other hand, if there is no response, the service search unit 23 gives notice to the control unit 26 that no response is obtained. The control unit 26 determines whether a number of service inquiries more than the prescribed number are repeatedly made after the wireless transmission power is raised (step S309). The prescribed number is stored in advance in the RAM 12 and referred to by the control unit 14 at the time of the determination in step S309.

If the result of the determination in step S309 shows that a number of service inquiries more than the prescribed number are not repeatedly made, the flow advances to step S307. In step S307, the control unit 26 instructs the wireless unit 22 to further raise the transmission power (wireless transmission power). The control unit 26 also instructs the service search unit 23 to make a service inquiry again. With these instructions, the wireless transmission power is further raised, and a service inquiry is made again.

The processes from step S307 to step S309 are repeated while gradually raising the wireless transmission power. The control unit 26 determines whether the number of repetitions is more than the prescribed number (S309). If the number of repetitions is more than the prescribed number, the control unit 26 instructs the communication unit 24 and wireless unit 22 to disconnect the connection. The wireless unit 22 performs the process of disconnecting the connection with the already connected device (step S310).

As described above, a wireless communication terminal having a service discovery function can continue data communication even if the radio wave condition around it temporarily deteriorates or temporary movement which may change the radio wave environment occurs. This improves convenience. Also, the wireless communication terminal can raise its transmission power as needed and thus can achieve power savings. Additionally, since the wireless communication terminal is not disconnected from a target device until the number of service inquiries reaches a prescribed number, communication management suitable for wireless communication can be performed.

Second Embodiment

This embodiment will explain a case where there are two or more communication partners. The configuration of a communication terminal and that of a program are the same as those of the first embodiment, and an explanation thereof will be omitted. Differences in program details will be explained below. If there are two or more connection partners, service information held in a cache storage unit 25 is provided by two or more devices. In this case, even if the communication terminal is connected with the plurality of partners, it is not always simultaneously communicating with them.

A method in which a service inquiry is made again if responses from all connected partners cannot be received after a service inquiry is made increases network traffic. Under these circumstances, in this embodiment, even if there are a plurality of connection partners, and no response to a service inquiry is obtained from a partner with which the communication terminal is communicating data, an inquiry is made again at a raised transmission power.

Figure 4:
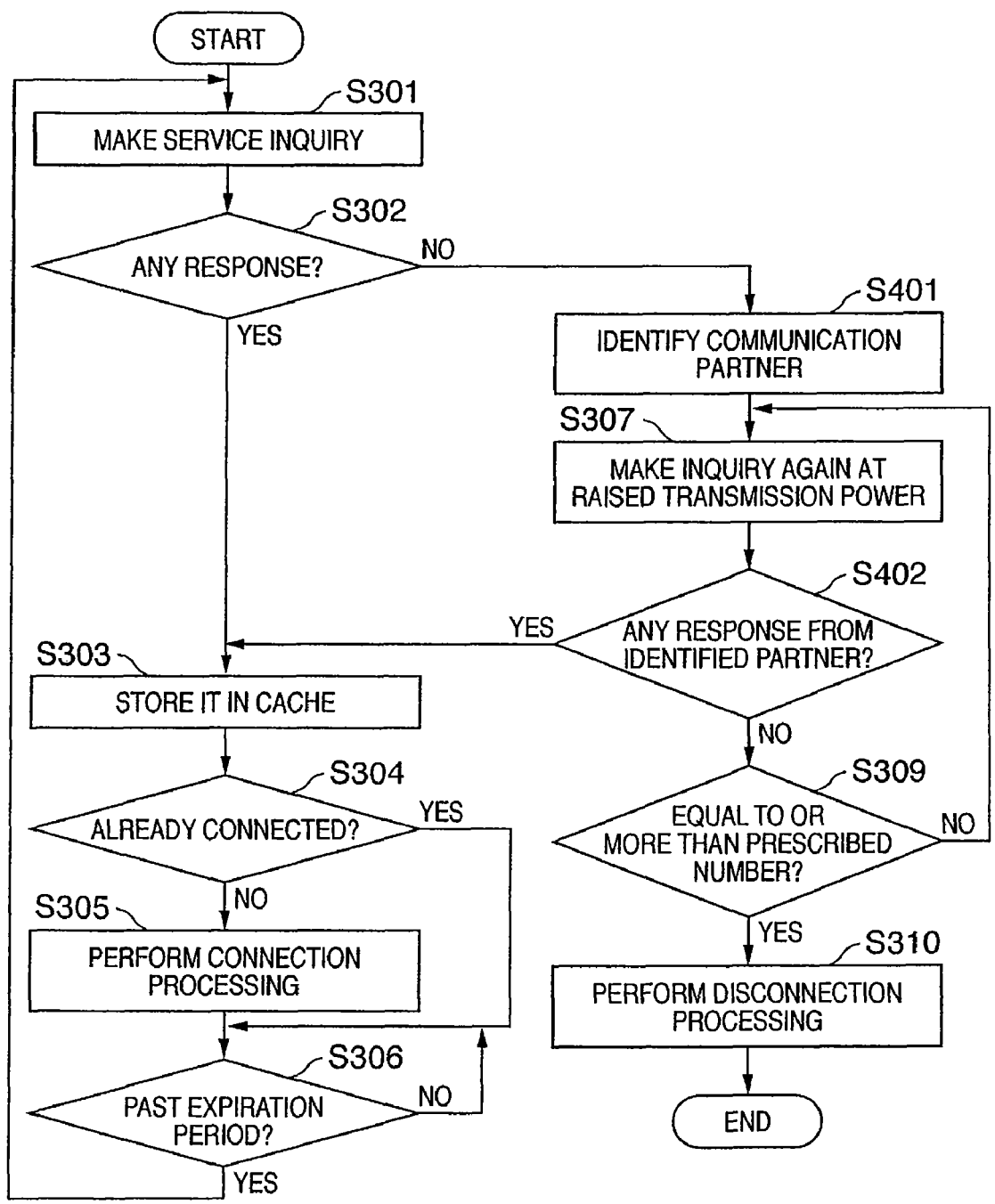
FIG. 4 is an operation flowchart of a communication terminal for explaining the second embodiment.

FIG. 4 is a flowchart for explaining the start and end of data communication using service discovery according to this embodiment. For the sake of descriptive simplicity, differences from the first embodiment will be explained.

If it is determined in step S302 that no response is obtained, a service search unit 23 gives notice to a control unit 26 that no response is obtained. The control unit 26 identifies a partner which is a service-providing-device connected by a process in step S305 and with which the communication terminal is actually currently communicating packets (step S401). The control unit 26 stores the identification information (e.g., a MAC address) of the partner identified as a communication partner. A partner with which the communication terminal is actually communicating packets refers to one with which it is communicating data such as an image. For example, even while a camera is transmitting an image to a printer, a service inquiry is made if the expiration period of the service information has passed. Assuming that the communication terminal of this embodiment is a camera, the camera identifies a printer at the other end in step S401.

After that, in accordance with an instruction from the control unit 26, a wireless unit 22 raises the wireless transmission power and makes a service inquiry again (step S307). The control unit 26 confirms whether there are any responses to the service inquiry from the partner identified in step S401. A response to a service inquiry contains the identification information (MAC address) of the device that responded. Accordingly, it is determined whether identification information contained in a received response coincides with that stored in step S401. If they coincide with each other, it is determined that the response is one from the partner that identified in step S401, and the flow advances to step S303. On the other hand, if they do not coincide with each other, it is determined that a response from the partner that identified in step S401 cannot be received, and the flow advances to step S309. In step S309, it is determined whether the number of repetitions is more than a prescribed number.

In the above explanation, it is confirmed in step S302 whether there is any response from unspecified partners. Alternatively, if there is a partner which is already connected, it may be confirmed whether there is a response from the already connected partner. As described above, narrowing down conditions for raising the transmission power makes it possible to reduce power consumption and effects on peripheral wireless devices.

As described above, according to this embodiment, if a response cannot be received from a partner in communication, an inquiry is made again at a raised wireless transmission power. This makes it possible to reduce network traffic.

It is possible to reduce power consumption and effects on peripheral wireless devices by narrowing down conditions for raising the transmission power.

Third Embodiment

This embodiment will explain a discovery protocol in which devices of a network transmit advertising signals to each other and thereby manage their existence and services. An advertising signal is useful for a device to give notice of its existence or services.

An advertising signal contains expiration period information. A device having received an advertising signal manages the existence and service(s) of a device at the other end on the basis of an expiration period contained in the signal. When (or before) the expiration period designated by the transmitted advertising signal has passed, the device having transmitted the advertising signal transmits an advertising signal again and extends the expiration period of its existence and service(s).

In some cases, no advertising signal is transmitted from a device at the other end even when the expiration period of the device has passed. In this case, it cannot be determined in a wireless network whether the device at the other end has left the network or an advertising signal is temporarily unable to be received due to a change in radio wave environment.

Assume that in this embodiment, if no advertising signal is transmitted from a device at the other end even when the expiration period of the device at the other end has passed. In this case, the device itself transmits an advertising signal at a raised transmission power to give notice of its existence and service(s) to the device at the other end, regardless of the designated expiration period when the device at the other end receives the advertising signal and recognizes that the received advertising signal is transmitted ahead by a predetermined period or longer of the expiration period of the device having transmitted the advertising signal, the device at the other end determines that an advertising signal from itself has not reached the device and transmits an advertising signal at a raised transmission power. This method increases the probability that devices can recognize their existence and services even if the radio wave environment between them deteriorates. Consequently, data communication can be continued even if a communication environment temporarily changes. Additionally, transmission power can be raised as needed, and thus, power savings can be achieved.

This embodiment will be explained in detail below. The configuration of a communication terminal according to this embodiment is the same as that of the first embodiment, and an explanation thereof will be omitted. Devices on a network operate in the same manner. For the sake of descriptive simplicity, this embodiment will be explained on the assumption that two devices are connected with each other by wireless communication and are in a communication state.

Figure 5:
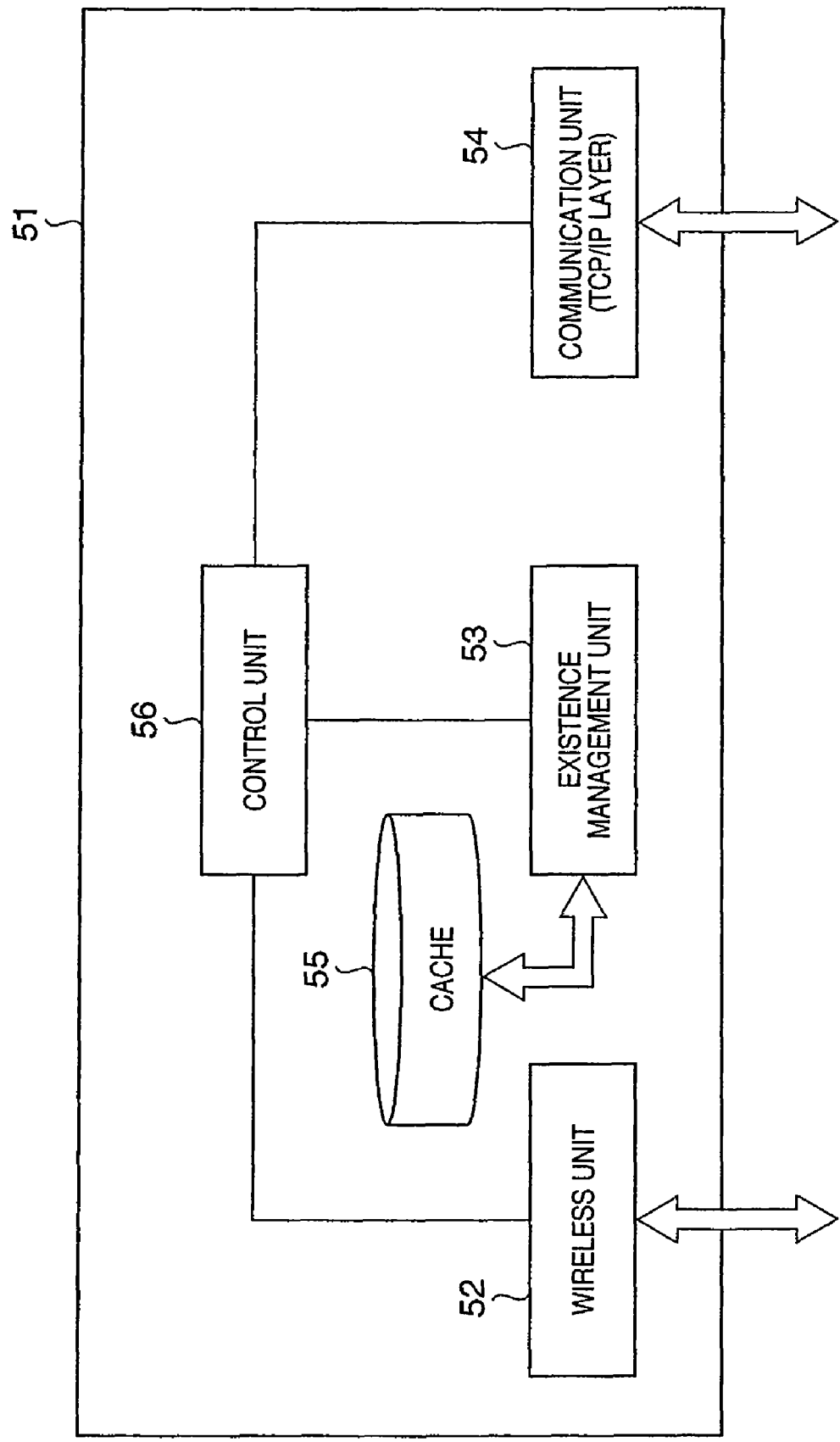
FIG. 5 is a configuration diagram of software executed by a CPU according to a third embodiment of the present invention.

FIG. 5 shows software components to be operated by a CPU 13 which are within software stored in a ROM 11. The software presides over data communication using a discovery protocol according to this embodiment.

The software, software 51 has a communication unit 54 which presides over data transmission and reception, a wireless unit 52 which performs wireless communication, and an existence management unit 53 which manages the existence thereof and of the communication terminal and that of other devices. The software 51 also has a cache storage unit 55 for temporarily accumulating the expiration period of the existence designated by the communication terminal itself and those of the existence of other devices and a control unit 56 which controls units under the control of the CPU 13. The cache storage unit 55 stores, in a RAM 12, information to be actually cached. The communication unit 54 presides over communication control of the TCP/IP layer in wireless communication by the wireless unit 52.

Figure 6:
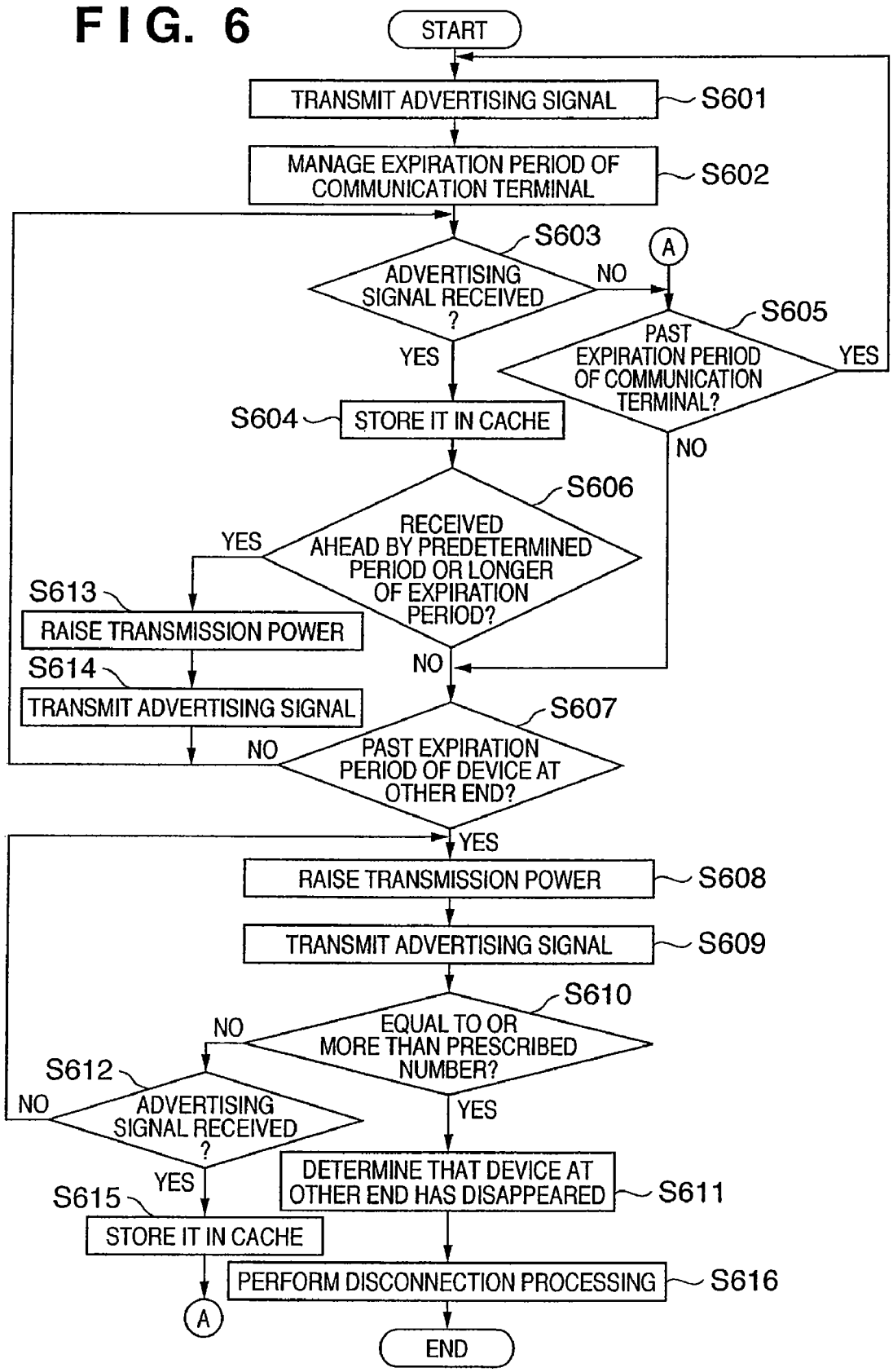
FIG. 6 is an operation flowchart of a communication terminal for explaining the third embodiment.

FIG. 6 is a flowchart for explaining the operation of the communication terminal according to this embodiment. Note that the operation of FIG. 6 is performed by the control unit 14's executing the program shown in FIG. 5. In the explanation below, the process of transmitting an advertising signal is performed when the expiration period of the existence of the communication terminal thereof or a device at the other end has passed. Alternatively, an advertising signal may be transmitted before (preferably immediately before) the expiration period has passed. The explanation of FIG. 6 will describe device existence management. Instead of existence management, service notice may be given or service management may be performed using an advertising signal. Alternatively, both existence and services may be managed.

When the communication terminal is connected with a device at the other end by wireless communication, the existence management unit 53 transmits an advertising signal using the wireless unit 52 and communication unit 54 under the control of the control unit 56 (step S601). With this operation, the communication terminal can give notice of its existence to the device at the other end. The existence management unit 53 stores the expiration period of the existence designated by the advertising signal in the cache storage unit 55 (step S602).

The existence management unit 53 performs monitoring to detect whether an advertising signal is transmitted from the device at the other end (step S603). If no advertising signal can be received from the device at the other end, the existence management unit 53 determines whether the expiration period of the existence of the communication terminal has passed (step S605). If the expiration period has passed, the flow returns to step S601 to transmit an advertising signal again.

On the other hand, if an advertising signal is received from the device at the other end in step S603, the existence management unit 53 manages the existence of the device at the other end by storing an expiration period contained in the received advertising signal in the cache storage unit 55 (step S604). At this time, the expiration period designated by the advertising signal is stored separately from the last expiration period designated by the device at the other end.

The existence management unit 53 determines whether the received advertising signal is transmitted ahead by a predetermined period or longer of the expiration period designated last time (step S606). The determination is made by referring to the last expiration period stored in the cache. Note that the communication terminal, of course, comprises a timer for timing.

If the advertising signal is transmitted ahead by the predetermined period or longer, the existence management unit 53 determines that the advertising signal transmitted by the communication terminal has not reached the device at the other end and gives notice to that effect to the control unit 56. Upon receipt of the notice, the control unit 56 instructs the wireless unit 52 to raise the transmission power (wireless transmission power) of the communication terminal (step S613). The control unit 56 also instructs the existence management unit 53 to transmit an advertising signal (step S614). Consequently, an advertising signal is transmitted at the raised transmission power. With this operation, the probability that an advertising signal reaches the device at the other end can be increased. After the advertising signal is transmitted in step S614, the flow returns to step S603.

If the result of the determination in step S606 shows that the advertising signal is transmitted in accordance with the expiration period, the existence management unit 53 determines whether the latest expiration period stored in step S604 has passed (step S607). If the expiration period has not passed, the flow returns to step S603; otherwise, the existence management unit 53 gives notice to the control unit 56 that the expiration period has passed.

The control unit 56 cannot determine whether an advertising signal cannot be received because the device at the other end has left a network or an advertising signal cannot be received from the device at the other end due to a change in radio wave environment. For this reason, the control unit 56 instructs the wireless unit 52 to raise the transmission power (wireless transmission power) (step S608) and instructs the existence management unit 53 to transmit an advertising signal (step S609). Consequently, an advertising signal is transmitted at the raised transmission power, and the probability that an advertising signal reaches the device at the other end can be increased.

In step S609, the existence management unit 53 determines whether the number of times an advertising signal is transmitted is not less than a prescribed number (step S610). If the number of times is not less than the prescribed number, the existence management unit 53 determines that continuation of communication with the device at the other end is impossible. That is, the existence management unit 53 determines that the device at the other end has left the network and disappeared and gives notice to that effect to the control unit 56 (step S611). Upon receipt of the notice, the control unit 56 determines that the device at the other end has disappeared from the network and disconnects the communication with the device at the other end (step S616).

On the other hand, if the number of times is less than the prescribed number, the flow advances to step S612. The existence management unit 53 determines whether the device at the other end having received the advertising signal transmitted in step S609 has received the advertising signal transmitted in steps S613 and S614. If no advertising signal is received, the flow returns to step S608. In step S608, the existence management unit 53 transmits an advertising signal at the further raised transmission power. On the other hand, an advertising signal is received, the existence management unit 53 stores an expiration period contained in the received advertising signal in the cache storage unit 55, and the flow advances to step S605.

As described above, this embodiment increases the probability that devices can recognize their existence and services even if the radio wave environment between them deteriorates. Consequently, data communication can be continued even if a communication environment temporarily changes. Additionally, transmission power can be raised as needed, and thus, power savings can be achieved.

As has been described above, according to the first to third embodiments, communication management suitable for an environment in which a communication environment changes can be performed. For example, even if a factor such as a change in communication environment occurs, communication with a device at the other end can be continued as long as possible. In other words, the likelihood of accidentally disconnecting connection with the device at the other end due to a factor such as a change in communication environment can be reduced.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-181895, filed Jun. 22, 2005, which is hereby incorporated by reference herein in its entirety.

What is claimed is:

1. A communication apparatus which gives notice of existence to another device on a network, comprising:
   a transmission unit which transmits a communication apparatus notice signal to notify the other device of the existence of said communication apparatus and of a communication apparatus expiration period of information on service provided by said communication apparatus whenever the communication apparatus expiration period has elapsed;
   a receiving unit which receives a device notice signal to notify the communication apparatus of the existence of a first other device and of a device expiration period of information on service provided by the first other device;
   a management unit which manages the first other-device expiration period of information on service provided by the first other device on the basis of a previously received first other-device notice signal transmitted from the first other device, and manages the communication apparatus expiration period of information on service provided by said communication apparatus; and
   a decision unit which decides whether or not a second other-device notice signal has been transmitted from the first other device before a time prior to the first other-device expiration period managed by said management unit by a predetermined time,
   wherein if the second other-device notice signal has been transmitted from the first other device at a time prior to the first other-device expiration period managed by said management unit by the predetermined time, said transmission unit transmits the communication apparatus notice signal by increasing a transmission power, independently of whether or not the communication apparatus expiration period managed by said management unit has expired.

2. The communication apparatus according to claim 1, further comprising:
   a determination unit which determines the number of times the communication apparatus notice signal is re-transmitted at a changed transmission power by said transmission unit, and
   a disconnection unit which, when the communication apparatus has an ongoing connection with the other device, disconnects communication with the other device depending on a determination obtained from said determination unit.

3. A communication method comprising:
   a transmission step of transmitting, by a communication apparatus, a communication apparatus notice signal to notify the other device of the existence of the communication apparatus and of a communication apparatus expiration period of information on service provided by the communication apparatus whenever the communication apparatus expiration period has elapsed;
   a receiving step of receiving a device notice signal to notify the communication apparatus of the existence of a first other device and of a device expiration period of information on service provided by the first other device;
   a management step of managing the first other-device expiration period of information on service provided by the first other device on the basis of a previously received first other-device notice signal transmitted from the first other device, and managing the communication apparatus expiration period of information on service provided by the communication apparatus; and
   a decision step of deciding whether or not a second other-device notice signal has been transmitted from the first other device before a time prior to the first other-device expiration period managed by said management unit by a predetermined time,
   wherein if the second other-device notice signal has been transmitted from the first other device at a time prior to the first other-device expiration period managed in said management step by the predetermined time, said transmission step is executed to transmit the communication apparatus notice signal by increasing a transmission power, independently of whether or not the communication apparatus expiration period managed in said management step has expired.

* * * * *